United States Patent
Dai et al.

(10) Patent No.: US 10,511,246 B2
(45) Date of Patent: Dec. 17, 2019

(54) INITIAL ROTOR POSITION DETECTION DEVICE AND METHOD BASED ON PERMANENT-MAGNET SYNCHRONOUS MOTOR

(71) Applicant: Wenzhou University, Wenzhou (CN)

(72) Inventors: Yuxing Dai, Wenzhou (CN); Xiukai Ruan, Wenzhou (CN); Qibo Cai, Wenzhou (CN); Kelu Wu, Wenzhou (CN)

(73) Assignee: Wenzhou University, Wenzhou (CN)

( * ) Notice: Subject to any disclaimer, the term of this patent is extended or adjusted under 35 U.S.C. 154(b) by 0 days.

(21) Appl. No.: 16/137,041

(22) Filed: Sep. 20, 2018

(65) Prior Publication Data

US 2019/0036469 A1   Jan. 31, 2019

(30) Foreign Application Priority Data

Jul. 25, 2017  (CN) .......................... 2017 1 0612153

(51) Int. Cl.
*H02P 21/32*   (2016.01)
*H02P 6/34*    (2016.01)
*H02P 21/34*   (2016.01)
*H02P 6/20*    (2016.01)
*H02P 21/22*   (2016.01)

(52) U.S. Cl.
CPC ............... *H02P 21/32* (2016.02); *H02P 6/20* (2013.01); *H02P 6/34* (2016.02); *H02P 21/34* (2016.02); *H02P 21/22* (2016.02)

(58) Field of Classification Search
CPC ...................................................... H02P 21/32
USPC ................................................... 318/700, 599
See application file for complete search history.

(56) References Cited

U.S. PATENT DOCUMENTS 9,991,719 B2 * 6/2018 Krolak ..................... H02J 4/00

* cited by examiner

Primary Examiner — David Luo

(57) ABSTRACT

An initial rotor position detection device based on a permanent-magnet synchronous motor, including a host computer, a real-time simulation system, and a control system, where the real-time simulation system is connected to the control system, for determining an encoder pulse signal according to the model parameter of the permanent-magnet synchronous motor, the model parameter of the inverter, and a PWM pulse wave generated by the control system; and the control system is connected to the real-time simulation system, for using a binary search algorithm to determine an initial rotor angle of the permanent-magnet synchronous motor according to the encoder pulse signal sent by the real-time simulation system. A comprehensive closed-loop test circuit can be achieved by setting a host computer, a real-time simulation system, and a control system, and a used binary search algorithm can effectively and quickly detect an initial rotor position of a permanent-magnet synchronous motor.

20 Claims, 3 Drawing Sheets

INITIAL ROTOR POSITION DETECTION DEVICE AND METHOD BASED ON PERMANENT-MAGNET SYNCHRONOUS MOTOR

BACKGROUND OF INVENTION

1. Field of Invention

The present invention relates to the technical field of initial rotor position detection, and in particular, to an initial rotor position detection device and method based on a permanent-magnet synchronous motor.

2. Background of Related Art

A permanent-magnet synchronous motor features a simple structure, low loss, light weight, high efficiency, optimal reliability, and the like, and is often used in such occasions as electric vehicles and aerospace. When an initial rotor position is unknown, directly starting the permanent-magnet synchronous motor may lead to an expected phenomenon; therefore, in order to better control the permanent-magnet synchronous motor, the initial rotor position should be determined before starting the permanent-magnet synchronous motor.

For high-power power electronic devices such as the permanent-magnet synchronous motor, experimenting directly on physical devices has many inconveniences. In the early stage of design, although offline simulation can be used to design and detect an initial angle of the permanent-magnet synchronous motor, the offline simulation cannot provide a comprehensive closed-loop test, has high costs, and requires a long system development cycle. Therefore, how to build an effective, fast and low-cost initial rotor position detection system based on the permanent-magnet synchronous motor is an urgent technical problem to be solved by a person skilled in the art.

SUMMARY OF THE INVENTION

An objective of the present invention is to provide an initial rotor position detection device and method based on a permanent-magnet synchronous motor, to establish a closed-loop test circuit and use a binary search algorithm to effectively and quickly detect an initial rotor position of a permanent-magnet synchronous motor, finally reducing the cost of a test system.

To achieve the above objective, the present invention provides an initial rotor position detection device based on a permanent-magnet synchronous motor, where the detection device includes: a host computer, a real-time simulation system, and a control system, where the host computer is connected to the real-time simulation system, for sending a model parameter of a configured permanent-magnet synchronous motor and a model parameter of an inverter to the real-time simulation system; the real-time simulation system is connected to the control system, for determining an encoder pulse signal according to the model parameter of the permanent-magnet synchronous motor, the model parameter of the inverter, and a PWM pulse wave generated by the control system; the control system is connected to the real-time simulation system, for determining a PWM pulse wave according to the encoder pulse signal sent by the real-time simulation system, and using a binary search algorithm to determine an initial rotor angle of the permanent-magnet synchronous motor according to the encoder pulse signal sent by the real-time simulation system; and the host computer is connected to the control system, for receiving and displaying the initial rotor angle of the permanent-magnet synchronous motor sent by the control system.

Optionally, the real-time simulation system includes: a pulse counting circuit, connected to the control system, for determining a duty ratio according to the PWM pulse wave generated by the control system; a first processor, respectively connected to the host computer and the pulse counting circuit, for establishing a permanent-magnet synchronous motor model according to the model parameter of the permanent-magnet synchronous motor sent by the host computer, and establishing an inverter model according to the model parameter of the inverter sent by the host computer, the inverter model being connected to the permanent-magnet synchronous motor model, and further for controlling the inverter model according to the duty ratio sent by the pulse counting circuit, to enable the permanent-magnet synchronous motor model to generate jitter, and determining an angular position jitter signal; and an encoder circuit, respectively connected to the first processor and the control system, for determining the encoder pulse signal according to the angular position jitter signal sent by the first processor, and send the encoder pulse signal to the control system.

Optionally, the real-time simulation system further includes: a first data acquisition circuit, respectively connected to the control system, the pulse counting circuit, and the encoder circuit, configured to acquire the PWM pulse wave generated by the control system, and send the PWM pulse wave to the pulse counting circuit, and configured to collect the encoder pulse signal generated by the encoder circuit and transmit the encoder pulse signal to the control system.

Optionally, the control system includes: a second processor, respectively connected to the host computer and the real-time simulation system, for determining a PWM pulse wave according to the encoder pulse signal sent by the real-time simulation system, and using the binary search algorithm to determine the initial rotor angle of the permanent-magnet synchronous motor according to the encoder pulse signal sent by the real-time simulation system, and sending the initial rotor angle of the permanent-magnet synchronous motor to the host computer; and a PWM generator, respectively connected to the second processor and the real-time simulation system, for determining the PWM pulse wave according to the PWM pulse signal sent by the second processor, and send the PWM pulse wave to the real-time simulation system.

Optionally, the control system further includes: a second data acquisition circuit, respectively connected to the real-time simulation system, the second processor, and the PWM generator, configured to acquire the encoder pulse wave generated by the real-time simulation system, and send the encoder pulse wave to the second processor, and further configured to acquire the PWM pulse signal generated by the PWM generator and transmit the PWM pulse signal to the real-time simulation system.

The present invention further provides an initial rotor position detection method based on a permanent-magnet synchronous motor, where the method is applied to the above-described initial rotor position detection device based on a permanent-magnet synchronous motor, and the method includes: obtaining a model parameter of a permanent-magnet synchronous motor and a model parameter of an inverter; establishing a permanent-magnet synchronous motor model according to the model parameter of the permanent-magnet synchronous motor, and establishing an inverter model according to the model parameter of the inverter; obtaining a PWM pulse wave; determining a duty ratio according to the PWM pulse wave; controlling the inverter model according to the duty ratio, to enable the permanent-magnet synchronous motor model to generate jitter, and obtaining an angular position jitter signal; determining the encoder pulse signal according to the angular position jitter signal; and using a binary search algorithm to determine the initial rotor angle of the permanent-magnet synchronous motor according to the encoder pulse signal.

Optionally, the obtaining a PWM pulse wave specifically includes: obtaining the encoder pulse signal; using the binary search algorithm to determine a PWM pulse signal according to the encoder pulse signal; and determining the PWM pulse wave according to the PWM pulse signal.

Optionally, the using a binary search algorithm to determine the initial rotor angle of the permanent-magnet synchronous motor according to the encoder pulse signal specifically includes: calculating a progressively increased current vector magnitude according to the encoder pulse signal; and using a binary search algorithm to determine the initial rotor angle of the permanent-magnet synchronous motor according to the progressively increased current vector magnitude and the encoder pulse signal.

According to specific embodiments provided in the present invention, the present invention discloses the following technical effects: According to the present invention, a comprehensive closed-loop test circuit can be achieved by setting a host computer, a real-time simulation system, and a control system, and a used binary search algorithm can effectively and quickly detect an initial rotor position of a permanent-magnet synchronous motor, reducing the cost of a test system.

BRIEF DESCRIPTION OF THE DRAWINGS

To describe the technical solutions in the embodiments of the present invention or in the prior art more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

In the figure, 1. host computer, 2. real-time simulation system, 21. first processor, 22. pulse counting circuit, 23. encoder circuit, 24. first data acquisition circuit, 3. control system, 31. second processor, 32. PWM generator, and 33. second data acquisition circuit.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide an initial rotor position detection device and method based on a permanent-magnet synchronous motor, to establish a closed-loop test circuit and use a binary search algorithm to effectively and quickly detect an initial rotor position of a permanent-magnet synchronous motor, finally reducing the cost of a test system.

To make the foregoing objective, features, and advantages of the present invention clearer and more comprehensible, the present invention is further described in detail below with reference to the accompanying drawings and specific embodiments.

Figure 1:
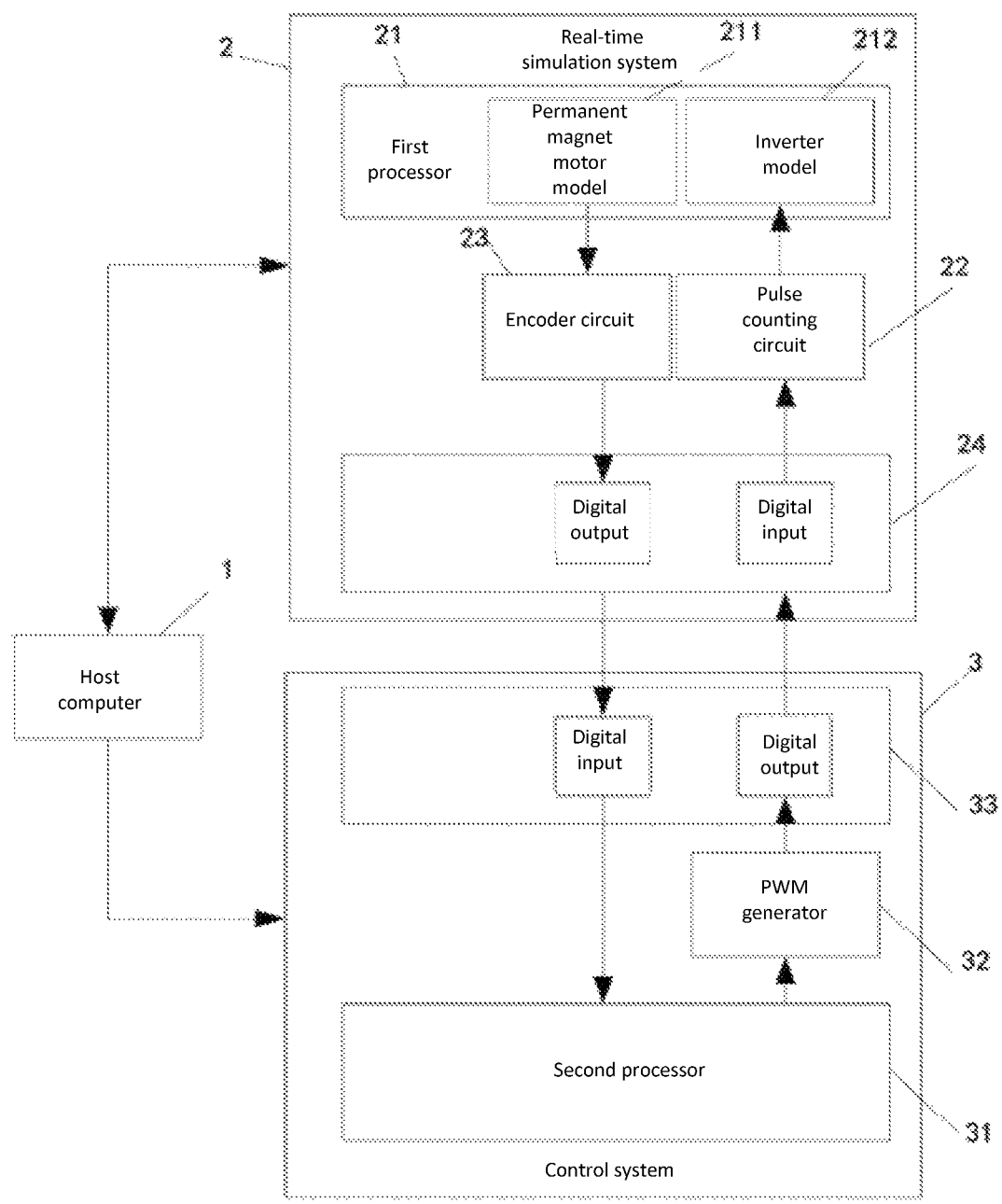
FIG. 1 is a structural diagram of an initial rotor position detection device based on a permanent-magnet synchronous motor according to an embodiment of the present invention.

FIG. 1 is a structural diagram of an initial rotor position detection device based on a permanent-magnet synchronous motor according to an embodiment of the present invention. As shown in FIG. 1, the present invention provides an initial rotor position detection device based on a permanent-magnet synchronous motor, where the detection device includes: a host computer 1, a real-time simulation system 2, and a control system 3.

The host computer 1 is connected to the real-time simulation system 2, for sending a model parameter of a configured permanent-magnet synchronous motor and a model parameter of an inverter to the real-time simulation system 2.

The control system 3 is connected to the real-time simulation system 2, for determining a PWM pulse wave according to the encoder pulse signal sent by the real-time simulation system 2, and using a binary search algorithm to determine an initial rotor angle of the permanent-magnet synchronous motor according to the encoder pulse signal sent by the real-time simulation system 2.

The host computer 1 is connected to the control system 3, for receiving and displaying the initial rotor angle of the permanent-magnet synchronous motor sent by the control system 3.

The real-time simulation system 2 includes a pulse counting circuit 22, a first processor 21, an encoder circuit 23, and a first data acquisition circuit 24. The control system 3 includes a second processor 31, a PWM generator 32, and a second data acquisition circuit 33. The encoder circuit 23 and the pulse counting circuit 22 in the present invention are constructed by an FPGA chip. The PWM generator 32 of the present invention is also constructed by an FPGA chip.

The PWM generator 32 is connected to the second processor 31, for determining the PWM pulse wave according to the PWM pulse signal sent by the second processor 31.

The second data acquisition circuit 33 is connected to the PWM generator 32, for receiving the PWM pulse wave sent by the PWM generator.

The first data acquisition circuit 24 in the real-time simulation system 2 is connected to the second data acquisition circuit 33 in the control system 3, for receiving the PWM pulse wave sent by the second data acquisition circuit 33.

The pulse counting circuit 22 is connected to the first data acquisition circuit 24, for determining a duty ratio according to the PWM pulse wave sent by the first data acquisition circuit 24.

The first processor 21 is connected to the host computer 1, for establishing a permanent-magnet synchronous motor model according to the model parameter of the permanent-magnet synchronous motor sent by the host computer 1, and establishing an inverter model according to the model parameter of the inverter sent by the host computer 1, the inverter model being connected to the permanent-magnet synchronous motor model.

The first processor 21 is further connected to the pulse counting circuit 22, for controlling the inverter model according to the duty ratio sent by the pulse counting circuit 22, to enable the permanent-magnet synchronous motor model to generate jitter, and determining an angular position jitter signal.

The encoder circuit 23 is connected to the first processor 21, for determining an encoder pulse signal according to the angular position jitter signal sent by the first processor 21.

The first data acquisition circuit 24 is also coupled to the encoder circuit 23, for collecting the encoder pulse signal generated by the encoder circuit 23.

The first data acquisition circuit 33 in the control system 3 is connected to the first data acquisition circuit 24 in the real-time simulation system 2, for receiving an encoder pulse signal sent by the first data acquisition circuit 24.

The second processor 31 is connected to the second data acquisition circuit 33, for using a binary search algorithm to determine an initial rotor speed of the permanent-magnet synchronous motor according to the encoder pulse signal sent by the second data acquisition circuit 33, and further for determining the PWM pulse signal according to the encoder pulse signal sent by the second data acquisition circuit 33.

The host computer 1 is connected to the second processor 31, for receiving and displaying the initial rotor angle of the permanent-magnet synchronous motor sent by the second processor 31.

Figure 2:
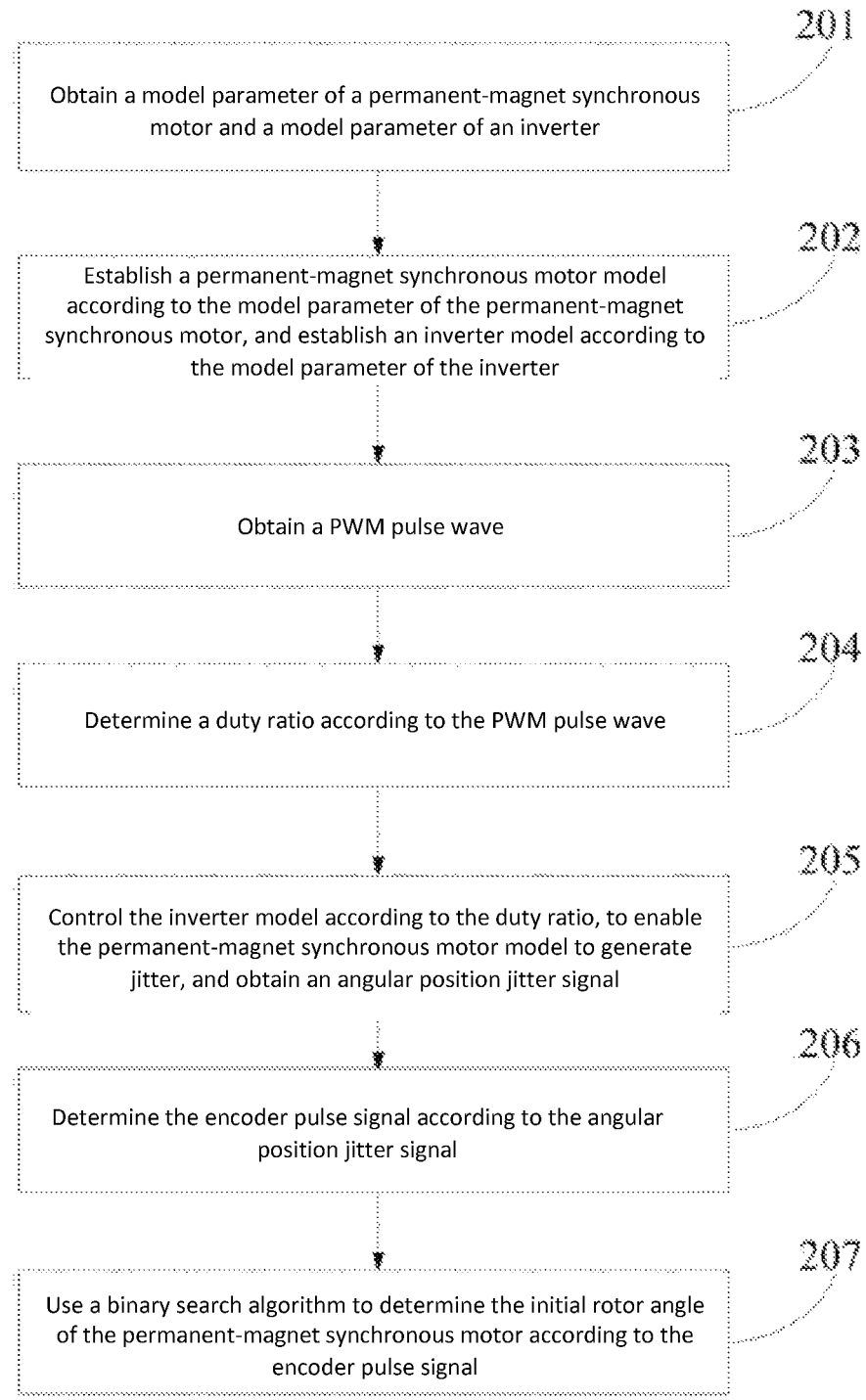
FIG. 2 is a structural diagram of an initial rotor position detection method based on a permanent-magnet synchronous motor according to an embodiment of the present invention.

FIG. 2 is a structural diagram of an initial rotor position detection method based on a permanent-magnet synchronous motor according to an embodiment of the present invention. As shown in FIG. 2, the present invention provides an initial rotor position detection method based on a permanent-magnet synchronous motor, where the detection method includes the following steps:

Step 201: obtain a model parameter of a permanent-magnet synchronous motor and a model parameter of an inverter.

Step 202: establish a permanent-magnet synchronous motor model according to the model parameter of the permanent-magnet synchronous motor, and establish an inverter model according to the model parameter of the inverter.

Step 203: obtain a PWM pulse wave. The specific steps are as follows:

Step 2031: obtain the encoder pulse signal;

Step 2032: use the binary search algorithm to determine a PWM pulse signal according to the encoder pulse signal; and Step 2033: determine the PWM pulse wave according to the PWM pulse signal.

Step 204: determine a duty ratio according to the PWM pulse wave.

Step 205: control the inverter model according to the duty ratio, to enable the permanent-magnet synchronous motor model to generate jitter, and obtain an angular position jitter signal.

Step 206: determine the encoder pulse signal according to the angular position jitter signal.

Step 207: use a binary search algorithm to determine the initial rotor angle of the permanent-magnet synchronous motor according to the encoder pulse signal. The specific steps are as follows:

Step 2071: calculate a progressively increased current vector magnitude according to the encoder pulse signal; and Step 2072: use the binary search algorithm to determine the initial rotor angle of the permanent-magnet synchronous motor according to the progressively increased current vector magnitude and the encoder pulse signal.

Figure 3:
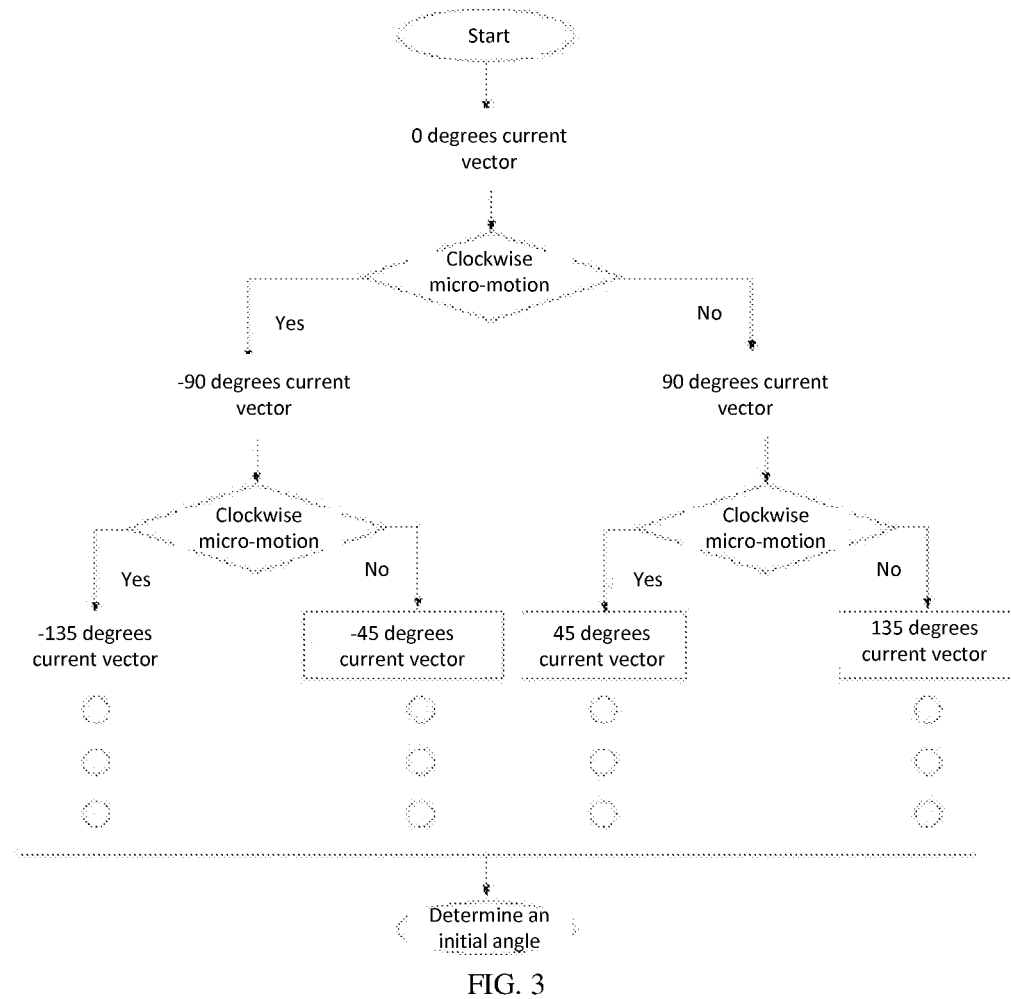
FIG. 3 is a flow chart of a binary search algorithm according to an embodiment of the present invention.

FIG. 3 is a flow chart of a binary search algorithm according to an embodiment of the present invention. As shown in FIG. 3, the specific steps of the binary search algorithm are as follows:

(1) After power-on, a current vector with an angle of 0 degrees from the A axis direction is generated. Once rotor jitter is detected, the functioning current vector is immediately set to zero.

(2) At this time, the rotor jitter direction is determined; if the rotor jitters clockwise, the rotor falls between −180 and 0 degrees; otherwise, the rotor falls between 0 and 180 degrees.

(3) When the rotor falls between 0 and 180 degrees, a current vector with an angle of 90 degrees from the A axis is generated after power-on; when the rotor falls between 0 and −180 degrees, a current vector with an angle of −90 degrees from the A axis is generated. At this time, when rotor micro-motion is detected, the functioning current vector is immediately set to zero.

(4) When the current vector with an angle of 90 degrees from the A axis functions, determine whether the direction of the rotor micro-motion is clockwise; if the rotor has clockwise micro-motion, the rotor falls between 0 and 90 degrees; otherwise the rotor falls between 90 and 180 degrees; when the current vector with an angle of −90 degrees from the A axis functions, determine whether the direction of the rotor micro-motion is clockwise; if the rotor has clockwise micro-motion, the rotor falls between −90 degrees and −180 degrees, otherwise the rotor falls between −90 and 0 degrees.

(5) The following operation is by analogy; each time the interval is reduced by one-half, until the added current vector makes the permanent-magnet synchronous motor no longer shake, and the magnitude of the rotor angle at this time is the actual rotor position angle of the permanent-magnet synchronous motor.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the invention.

We claim:

1. An initial rotor position detection device based on a permanent-magnet synchronous motor, where the detection device comprises: a host computer, a real-time simulation system, and a control system, wherein the host computer is connected to the real-time simulation system, for sending a model parameter of a configured permanent-magnet synchronous motor and a model parameter of an inverter to the real-time simulation system;

the real-time simulation system is connected to the control system, for determining an encoder pulse signal according to the model parameter of the permanent-magnet synchronous motor, the model parameter of the inverter, and a PWM pulse wave generated by the control system;

the control system is connected to the real-time simulation system, for determining a PWM pulse wave according to the encoder pulse signal sent by the real-time simulation system, and using a binary search algorithm to determine an initial rotor angle of the permanent-magnet synchronous motor according to the encoder pulse signal sent by the real-time simulation system; and the host computer is connected to the control system, for receiving and displaying the initial rotor angle of the permanent-magnet synchronous motor sent by the control system.

2. The initial rotor position detection device based on a permanent-magnet synchronous motor according to claim 1, wherein the real-time simulation system comprises:

a pulse counting circuit, connected to the control system, for determining a duty ratio according to the PWM pulse wave generated by the control system;

a first processor, respectively connected to the host computer and the pulse counting circuit, for establishing a permanent-magnet synchronous motor model according to the model parameter of the permanent-magnet synchronous motor sent by the host computer, and establishing an inverter model according to the model parameter of the inverter sent by the host computer, the inverter model being connected to the permanent-magnet synchronous motor model, and further for controlling the inverter model according to the duty ratio sent by the pulse counting circuit, to enable the permanent-magnet synchronous motor model to generate jitter, and determining an angular position jitter signal; and an encoder circuit, respectively connected to the first processor and the control system, for determining the encoder pulse signal according to the angular position jitter signal sent by the first processor, and send the encoder pulse signal to the control system.

3. The initial rotor position detection device based on a permanent-magnet synchronous motor according to claim 2, wherein the real-time simulation system further comprises:

a first data acquisition circuit, respectively connected to the control system, the pulse counting circuit, and the encoder circuit, configured to acquire the PWM pulse wave generated by the control system, and send the PWM pulse wave to the pulse counting circuit, and configured to collect the encoder pulse signal generated by the encoder circuit and transmit the encoder pulse signal to the control system.

4. An initial rotor position detection method based on a permanent-magnet synchronous motor, wherein the method is applied to the initial rotor position detection device based on a permanent-magnet synchronous motor according to claim 3, and the method comprises:

obtaining a model parameter of a permanent-magnet synchronous motor and a model parameter of an inverter;

establishing a permanent-magnet synchronous motor model according to the model parameter of the permanent-magnet synchronous motor, and establishing an inverter model according to the model parameter of the inverter;

obtaining a PWM pulse wave;

determining a duty ratio according to the PWM pulse wave;

controlling the inverter model according to the duty ratio, to enable the permanent-magnet synchronous motor model to generate jitter, and obtaining an angular position jitter signal;

determining the encoder pulse signal according to the angular position jitter signal; and using a binary search algorithm to determine the initial rotor angle of the permanent-magnet synchronous motor according to the encoder pulse signal.

5. The initial rotor position detection method based on a permanent-magnet synchronous motor according to claim 4, wherein the obtaining a PWM pulse wave specifically comprises:

obtaining the encoder pulse signal;

using the binary search algorithm to determine a PWM pulse signal according to the encoder pulse signal; and determining the PWM pulse wave according to the PWM pulse signal.

6. The initial rotor position detection method based on a permanent-magnet synchronous motor according to claim 4, wherein the using a binary search algorithm to determine the initial rotor angle of the permanent-magnet synchronous motor according to the encoder pulse signal specifically comprises:

calculating a progressively increased current vector magnitude according to the encoder pulse signal; and using a binary search algorithm to determine the initial rotor angle of the permanent-magnet synchronous motor according to the progressively increased current vector magnitude and the encoder pulse signal.

7. An initial rotor position detection method based on a permanent-magnet synchronous motor, wherein the method is applied to the initial rotor position detection device based on a permanent-magnet synchronous motor according to claim 2, and the method comprises:

obtaining a model parameter of a permanent-magnet synchronous motor and a model parameter of an inverter;

establishing a permanent-magnet synchronous motor model according to the model parameter of the permanent-magnet synchronous motor, and establishing an inverter model according to the model parameter of the inverter;

obtaining a PWM pulse wave;

determining a duty ratio according to the PWM pulse wave;

controlling the inverter model according to the duty ratio, to enable the permanent-magnet synchronous motor model to generate jitter, and obtaining an angular position jitter signal;

determining the encoder pulse signal according to the angular position jitter signal; and using a binary search algorithm to determine the initial rotor angle of the permanent-magnet synchronous motor according to the encoder pulse signal.

8. The initial rotor position detection method based on a permanent-magnet synchronous motor according to claim 7, wherein the obtaining a PWM pulse wave specifically comprises:

obtaining the encoder pulse signal;

using the binary search algorithm to determine a PWM pulse signal according to the encoder pulse signal; and determining the PWM pulse wave according to the PWM pulse signal.

9. The initial rotor position detection method based on a permanent-magnet synchronous motor according to claim 7, wherein the using a binary search algorithm to determine the initial rotor angle of the permanent-magnet synchronous motor according to the encoder pulse signal specifically comprises:
  calculating a progressively increased current vector magnitude according to the encoder pulse signal; and
  using a binary search algorithm to determine the initial rotor angle of the permanent-magnet synchronous motor according to the progressively increased current vector magnitude and the encoder pulse signal.

10. The initial rotor position detection device based on a permanent-magnet synchronous motor according to claim 1, wherein the control system comprises:
  a second processor, respectively connected to the host computer and the real-time simulation system, for determining a PWM pulse wave according to the encoder pulse signal sent by the real-time simulation system, and using the binary search algorithm to determine the initial rotor angle of the permanent-magnet synchronous motor according to the encoder pulse signal sent by the real-time simulation system, and sending the initial rotor angle of the permanent-magnet synchronous motor to the host computer; and
  a PWM generator, respectively connected to the second processor and the real-time simulation system, for determining the PWM pulse wave according to the PWM pulse signal sent by the second processor, and send the PWM pulse wave to the real-time simulation system.

11. The initial rotor position detection device based on a permanent-magnet synchronous motor according to claim 10, wherein the control system further comprises:
  a second data acquisition circuit, respectively connected to the real-time simulation system, the second processor, and the PWM generator, configured to acquire the encoder pulse wave generated by the real-time simulation system, and send the encoder pulse wave to the second processor, and further configured to acquire the PWM pulse signal generated by the PWM generator and transmit the PWM pulse signal to the real-time simulation system.

12. An initial rotor position detection method based on a permanent-magnet synchronous motor, wherein the method is applied to the initial rotor position detection device based on a permanent-magnet synchronous motor according to claim 11, and the method comprises:
  obtaining a model parameter of a permanent-magnet synchronous motor and a model parameter of an inverter;
  establishing a permanent-magnet synchronous motor model according to the model parameter of the permanent-magnet synchronous motor, and establishing an inverter model according to the model parameter of the inverter;
  obtaining a PWM pulse wave;
  determining a duty ratio according to the PWM pulse wave;
  controlling the inverter model according to the duty ratio, to enable the permanent-magnet synchronous motor model to generate jitter, and obtaining an angular position jitter signal;
  determining the encoder pulse signal according to the angular position jitter signal; and
  using a binary search algorithm to determine the initial rotor angle of the permanent-magnet synchronous motor according to the encoder pulse signal.

13. The initial rotor position detection method based on a permanent-magnet synchronous motor according to claim 12, wherein the obtaining a PWM pulse wave specifically comprises:
  obtaining the encoder pulse signal;
  using the binary search algorithm to determine a PWM pulse signal according to the encoder pulse signal; and
  determining the PWM pulse wave according to the PWM pulse signal.

14. The initial rotor position detection method based on a permanent-magnet synchronous motor according to claim 12, wherein the using a binary search algorithm to determine the initial rotor angle of the permanent-magnet synchronous motor according to the encoder pulse signal specifically comprises:
  calculating a progressively increased current vector magnitude according to the encoder pulse signal; and
  using a binary search algorithm to determine the initial rotor angle of the permanent-magnet synchronous motor according to the progressively increased current vector magnitude and the encoder pulse signal.

15. An initial rotor position detection method based on a permanent-magnet synchronous motor, wherein the method is applied to the initial rotor position detection device based on a permanent-magnet synchronous motor according to claim 10, and the method comprises:
  obtaining a model parameter of a permanent-magnet synchronous motor and a model parameter of an inverter;
  establishing a permanent-magnet synchronous motor model according to the model parameter of the permanent-magnet synchronous motor, and establishing an inverter model according to the model parameter of the inverter;
  obtaining a PWM pulse wave;
  determining a duty ratio according to the PWM pulse wave;
  controlling the inverter model according to the duty ratio, to enable the permanent-magnet synchronous motor model to generate jitter, and obtaining an angular position jitter signal;
  determining the encoder pulse signal according to the angular position jitter signal; and
  using a binary search algorithm to determine the initial rotor angle of the permanent-magnet synchronous motor according to the encoder pulse signal.

16. The initial rotor position detection method based on a permanent-magnet synchronous motor according to claim 15, wherein the obtaining a PWM pulse wave specifically comprises:
  obtaining the encoder pulse signal;
  using the binary search algorithm to determine a PWM pulse signal according to the encoder pulse signal; and
  determining the PWM pulse wave according to the PWM pulse signal.

17. The initial rotor position detection method based on a permanent-magnet synchronous motor according to claim 15, wherein the using a binary search algorithm to determine the initial rotor angle of the permanent-magnet synchronous motor according to the encoder pulse signal specifically comprises:
  calculating a progressively increased current vector magnitude according to the encoder pulse signal; and
  using a binary search algorithm to determine the initial rotor angle of the permanent-magnet synchronous motor according to the progressively increased current vector magnitude and the encoder pulse signal.

18. An initial rotor position detection method based on a permanent-magnet synchronous motor, wherein the method is applied to the initial rotor position detection device based on a permanent-magnet synchronous motor according to claim 1, and the method comprises:
- obtaining a model parameter of a permanent-magnet synchronous motor and a model parameter of an inverter;
- establishing a permanent-magnet synchronous motor model according to the model parameter of the permanent-magnet synchronous motor, and establishing an inverter model according to the model parameter of the inverter;
- obtaining a PWM pulse wave;
- determining a duty ratio according to the PWM pulse wave;
- controlling the inverter model according to the duty ratio, to enable the permanent-magnet synchronous motor model to generate jitter, and obtaining an angular position jitter signal;
- determining the encoder pulse signal according to the angular position jitter signal; and
- using a binary search algorithm to determine the initial rotor angle of the permanent-magnet synchronous motor according to the encoder pulse signal.

19. The initial rotor position detection method based on a permanent-magnet synchronous motor according to claim 18, wherein the obtaining a PWM pulse wave specifically comprises:
- obtaining the encoder pulse signal;
- using the binary search algorithm to determine a PWM pulse signal according to the encoder pulse signal; and
- determining the PWM pulse wave according to the PWM pulse signal.

20. The initial rotor position detection method based on a permanent-magnet synchronous motor according to claim 18, wherein the using a binary search algorithm to determine the initial rotor angle of the permanent-magnet synchronous motor according to the encoder pulse signal specifically comprises:
- calculating a progressively increased current vector magnitude according to the encoder pulse signal; and
- using a binary search algorithm to determine the initial rotor angle of the permanent-magnet synchronous motor according to the progressively increased current vector magnitude and the encoder pulse signal.

* * * * *